UNITED STATES PATENT OFFICE.

EDWIN ADAM, OF PHILADELPHIA, PENNSYLVANIA.

BEVERAGE OF FERMENTED AND UNFERMENTED WORT AND PROCESS OF MAKING THE SAME.

SPECIFICATION forming part of Letters Patent No. 483,337, dated September 27, 1892.

Application filed November 5, 1891. Serial No. 410,956. (No specimens.)

*To all whom it may concern:*

Be it known that I, EDWIN ADAM, a citizen of the United States, residing in the city and county of Philadelphia, State of Pennsylvania, have invented a new and useful Improvement in Beverages of Fermented and Unfermented Wort and Process of Making the Same, which improvement is fully set forth in the following specification.

My invention consists of a process hereinafter set forth of preparing a beverage consisting of blended fermented and unfermented worts artificially charged with alcohol and carbonic-acid gas.

It further consists of the beverage herein described and claimed.

In carrying out my invention I take fermented wort prepared as follows: Highly-kiln-dried malt is mashed in and off at a high temperature, so as to retain in the wort a high percentage of dextrine and a comparatively-low percentage of maltose. This wort is mixed with hops and boiled down to a desired gravity and then cooled, after which it is placed in any suitable vessel, where yeast is applied to it, thereby creating a fermentation and attenuating the wort. When this is sufficiently accomplished, the wort is placed in a suitable receptacle, where it becomes aged and clarified, and is then filtered of any yeast-cells it may contain. It is then introduced into an air-tight vessel or vessels, where it is kept until needed. This fermented wort I denominate as "preparation No. 1." I take unfermented wort prepared similar to the fermented wort just described, except that it is of less specific gravity and has no yeast placed therein, it being made from highly-kiln-dried malt or other suitable substance mashed in and off at a high temperature, mixed with hops boiled down, and cooled, settled, and clarified, as before described. This unfermented wort I call "preparation No. 2," and the same is forced into the air-tight vessel containing preparation No. 1, where it is blended with the latter in the proportions of about ten to twenty per cent. of fermented and ninety to eighty per cent. of unfermented wort. The composition is kept in circulation from the vessel containing it through a suitable alcohol and carbonic-acid gas charging apparatus, and when it is sufficiently charged it is forced through a filter and then racked into a suitable receptacle or receptacles for aging, after which it is ready for the market and use. By filtering preparation No. 1 so as to remove the yeast-cells therefrom little or no fermentation ensues in the composition when the unfermented wort is blended with fermented wort. The composition may before charging be aged either under vacuum or with alcohol.

Having thus described my invention, what I claim as new, and desire to secure by Letters Patent, is—

1. The process of preparing a beverage as herein set forth, consisting in highly drying malt, mashing in and off at a high temperature a quantity of the same and forming a fermented wort therefrom, mashing in and off at a high temperature another portion of said prepared malt, mixing said latter wort with hops, forming an unfermented wort, removing the yeast-cells from the fermented wort, blending said fermented and unfermented worts, and artificially charging the blended worts with alcohol and carbonic-acid gas, substantially as described.

2. The process of preparing the beverage described herein, consisting in treating malt so as to have a high percentage of dextrine and a low percentage of maltose, making hopped unfermented and fermented worts of the malt thus treated, removing the yeast-cells from the fermented wort, blending said worts, and charging the mixture with alcohol and carbonic-acid gas, and then aging the preparation in an air-tight vessel, substantially as described.

3. The beverage herein described, consisting of a mixture of unfermented and fermented worts, the fermented wort having a high percentage of dextrine and said worts being in the proportions set forth and charged with alcohol and carbonic-acid gas, as described.

EDWIN ADAM.

Witnesses:
JOHN A. WIEDERSHEIM,
A. P. JENNINGS.